Patented Sept. 18, 1945

2,385,066

UNITED STATES PATENT OFFICE 2,385,066

PREPARATION OF RED COPPER OXIDE

Arthur H. Du Rose, Euclid, and Charles F. Robison, Bay Village, Ohio, assignors to The Harshaw Chemical Company, Elyria, Ohio, a corporation of Ohio No Drawing. Application October 18, 1944, Serial No. 559,250

7 Claims. (Cl. 23—147)

This invention relates to the preparation of red cuprous oxide from cupric oxide and has for its object to provide a simple and effective process for effecting the reduction without the production of metallic copper and without leaving copper sulfate in the product.

Prior to our invention no process has been available, so far as we are aware, for reducing cupric oxide to cuprous oxide without difficulties arising from either the tendency to formation of metallic copper or on the other hand a tendency to leave copper sulfate in the product.

We have now discovered that a very successful result can be had by the use of both sulfur and carbon in a dry-way reaction according to the following equation:

$$28CuO + 4S + C \rightarrow 14Cu_2O + 4SO_3 + CO_2$$

While we are not certain of the mechanism of the foregoing, over all reaction, we believe it to occur in two stages as follows:

$$28CuO + 4S \rightarrow 12Cu_2O + 4CuSO_4$$
$$4CuSO_4 + C \rightarrow 2Cu_2O + 4SO_3 + CO_2$$

The reaction preferably is carried out in an inert atmosphere within the temperature range 600° C to 850° C. for a time ranging from 10 minutes to 24 hours, preferably from 30 minutes to two hours and is cooled to room temperature in an inert atmosphere. The reaction may be carried out in an atmosphere of steam, nitrogen, $CO_2$ or other inert gas including its own atmosphere of $SO_3$ and $CO_2$ evolved by the reaction.

The material may be calcined in saggers, in a rotary kiln, or in shallow trays. The product may be quenched in water and traces of sulfate thereby removed, but this introduces a drying problem and, therefore, it is preferred to cool the mass in an atmosphere of $CO_2$ or other inert gas.

While the proportions indicated by the formula would be optimum under ideal conditions, we find that in practice it is desirable to use a slight excess of sulfur, since some sulfur will be consumed by air which may remain in the furnace or may be mixed with the reactants. Carbon should be about theoretical. It is, of course, quite possible to realize the benefits of the invention to a large extent without using optimum proportions.

In the following table we show preferred outside limits of proportions and what we at present consider optimum ranges of proportions, it being understood that if a mixture of CuO and $Cu_2O$ is employed, only the CuO content is considered. Figures are in percentage of the combined weights of CuO, S and C in the batch.

CuO_____90% to 96%, preferably 91% to 94%
S_____3.6% to 8%, preferably 5.5% to 8%
C_____0.4% to 2%, preferably 0.5% to 1.0%

The materials used are in finely divided state. While in the appended examples, calcination was carried out at 610° C., experiments on a smaller scale indicate that the optimum temperature is higher, about 650° C. to 800° C.

The following examples from actual practice will serve to illustrate the invention:

Example I

A copper oxide analyzing 70.3% CuO and 29.7% $Cu_2O$ was mixed with sulfur and carbon. The batch consisted of 25 pounds of the copper oxide, 1.125 pounds of sulfur flour and 35 grams of carbon (lamp black). The batch was heated to a batch temperature of 610° C. for 40 minutes. (Larger batches require longer time.) The heating was carried out in a rotary kiln. Steam was passed through the kiln while the batch was being fired. The completed batch was cooled in an atmosphere of carbon dioxide to prevent reoxidation. The product was a very pure grade of red cuprous oxide of pigment quality, approximately 98.5% $Cu_2O$.

Example II

A copper oxide analyzing 99% CuO was mixed with sulfur and carbon. The batch consisted of 25 pounds of the copper oxide, 2 pounds 3 ounces of sulfur flour and 2¼ ounces of lamp black. Processing was carried out as in Example I and the resulting red cuprous oxide was of the same excellent quality.

What we claim is:

1. A process of producing cuprous oxide comprising heating cupric oxide in a non-oxidizing atmosphere with a mixture of sulfur and carbon whereby to reduce the cupric oxide to cuprous oxide with negligible formation of either metallic copper or sulfate.

2. A process of producing cuprous oxide comprising heating cupric oxide in an approximately neutral atmosphere with sulfur and carbon in the temperature range from 600° C. to 850° C. until the major portion of the cupric oxide has been reduced to cuprous oxide, the proportions of cupric oxide, sulfur and carbon, based on the combined weight of cupric oxide, sulfur and carbon in the batch being as follows: CuO, 90% to 96%; sulfur 3.6% to 8%; carbon 0.4% to 2%.

3. A process of producing cuprous oxide comprising heating cupric oxide in an approximately neutral atmosphere with sulfur and carbon in the temperature range from 600° C. to 850° C. until the major portion of the cupric oxide has been reduced to cuprous oxide, the proportions of cupric oxide, sulfur and carbon, based on the combined weight of cupric oxide, sulfur and carbon in the batch being as follows: CuO, 91% to 95%; sulfur, 5.5% to 8%; carbon 0.5% to 1.0%.

4. A process of producing cuprous oxide comprising heating cupric oxide in an approximately neutral atmosphere with sulfur and carbon in the temperature range from 650° C. to 800° C. until the major portion of the cupric oxide has been reduced to cuprous oxide, the proportions of cupric oxide, sulfur and carbon, based on the combined weight of cupric oxide, sulfur and carbon in the batch being as follows: CuO, 90% to 96%; sulfur, 3.6% to 8%; carbon, 0.4% to 2%.

5. A process of producing cuprous oxide comprising heating cupric oxide in an approximately neutral atmosphere with sulfur and carbon in the temperature range from 650° C. to 800° C. until the major portion of the cupric oxide has been reduced to cuprous oxide, the proportions of cupric oxide, sulfur and carbon, based on the combined weight of cupric oxide, sulfur and carbon in the batch being as follows: CuO, 91% to 95%; sulfur, 5.5% to 8%; carbon 0.5% to 1.0%.

6. A process of producing cuprous oxide comprising heating cupric oxide in an approximately neutral atmosphere with sulfur and carbon in the temperature range from 650° C. to 800° C. until the major portion of the cupric oxide has been reduced to cuprous oxide, the proportions of cupric oxide, sulfur and carbon, based on the combined weight of cupric oxide, sulfur and carbon in the batch being as follows: CuO, 90% to 96%; sulfur, 3.6% to 8%; carbon, 0.4% to 2%, and cooling the resulting product under non-oxidizing conditions.

7. A process of producing cuprous oxide comprising heating cupric oxide in an approximately neutral atmosphere with sulfur and carbon in the temperature range from 650° C. to 800° C. until the major portion of the cupric oxide has been reduced to cuprous oxide, the proportions of cupric oxide, sulfur and carbon, based on the combined weight of cupric oxide, sulfur and carbon in the batch being as follows: CuO, 91% to 95%; sulfur, 5.5% to 8%; carbon, 0.5% to 1.0%, and cooling the resulting product under non-oxidizing conditions.

ARTHUR H. DU ROSE.
CHARLES F. ROBISON.